(12) United States Patent
Velasquez

(10) Patent No.: US 12,330,288 B2
(45) Date of Patent: Jun. 17, 2025

(54) SEPARATION OF FILM LAYER FROM COMPOSITE PREPREG

(71) Applicant: The Boeing Company, Chicago, IL (US)

(72) Inventor: Luis Velasquez, Ladson, SC (US)

(73) Assignee: The Boeing Company, Chicago, IL (US)

( * ) Notice: Subject to any disclaimer, the term of this patent is extended or adjusted under 35 U.S.C. 154(b) by 289 days.

(21) Appl. No.: 18/050,335

(22) Filed: Oct. 27, 2022

(65) Prior Publication Data

US 2024/0139963 A1 May 2, 2024

(51) Int. Cl.
| | |
|---|---|
| *B25J 11/00* | (2006.01) |
| *B25J 9/16* | (2006.01) |
| *B25J 13/08* | (2006.01) |
| *B25J 15/00* | (2006.01) |
| *B29C 63/00* | (2006.01) |
| *B29K 105/08* | (2006.01) |
| *B29L 31/30* | (2006.01) |

(52) U.S. Cl.
CPC ........... *B25J 11/005* (2013.01); *B25J 9/1682* (2013.01); *B25J 9/1684* (2013.01); *B25J 13/08* (2013.01); *B25J 15/0019* (2013.01); *B29C 63/0013* (2013.01); *B29K 2105/0872* (2013.01); *B29L 2031/3076* (2013.01)

(58) Field of Classification Search
None
See application file for complete search history.

(56) References Cited

U.S. PATENT DOCUMENTS

| | | | |
|---|---|---|---|
| 5,861,077 | A | 1/1999 | Kamijo et al. |
| 6,280,107 | B2 | 8/2001 | Watanabe et al. |
| 9,358,770 | B2 | 6/2016 | Dong et al. |
| 2015/0314584 | A1 | 11/2015 | Dong et al. |
| 2016/0311212 | A1 | 10/2016 | Dong et al. |

FOREIGN PATENT DOCUMENTS

| | | |
|---|---|---|
| DE | 69522309 T2 | 5/2002 |
| EP | 3569535 A1 | 11/2019 |
| KR | 1020160143325 B1 | 2/2017 |

OTHER PUBLICATIONS

Machine translation DE69522309 (Year: 2002).*
Machine translation KR20160143325A (Year: 2016).*
European Patent Office Extended Search Report, dated Mar. 13, 2024, regarding Application No. 23196511.2, 8 pages.

* cited by examiner

*Primary Examiner* — Jacob T Minskey
*Assistant Examiner* — Wayne K. Swier
(74) *Attorney, Agent, or Firm* — Yee & Associates, P.C.

(57) ABSTRACT

A film layer adhered to a ply of prepreg is separated from the ply by clamping the ply between two clamping members and flicking an exposed edge of the ply.

20 Claims, 11 Drawing Sheets

US 12,330,288 B2

SEPARATION OF FILM LAYER FROM COMPOSITE PREPREG

BACKGROUND INFORMATION

1. Field

The present disclosure generally relates to the production of composite laminate parts, and deals more particularly with a method, apparatus and system for separating a poly backing film from composite prepreg.

2. Background

Thermoset preimpregnated ("prepreg") composite material is normally supplied as a single ply thickness in roll form having an adhered poly film layer on one side of the ply. The poly film layer functions to prevent layer-to-layer sticking when the material is in roll form or stacked as sheets. The poly film layer, sometimes referred to as "backing paper" remains on the ply to prevent sticking while it is being stored and/or cut to a final shape. The poly film layer must be removed before the ply is laid up to form a composite part. The use of automated equipment to remove the poly film layer in high production environments can be challenging because the removal process must begin with the initial step of separating film layer from the ply along an edge of the ply. Separating the film from the ply is also challenging because the separation process must avoid damaging or contaminating the ply.

Accordingly, it would be desirable to provide a method, apparatus and system which separate the film layer from a prepreg ply that can be automated and which avoids damaging or contaminating the ply during the separation process.

SUMMARY

The disclosure relates in general to making composite parts using thermoset prepreg, and particularly to separating a poly film backing on a ply of prepreg.

According to one aspect, a method is provided of separating a film layer adhered to a ply of composite prepreg. The method comprises clamping the ply between a first clamping member and a second clamping member, with an edge of the ply exposed suspended in air. The method also includes flicking an edge of the ply using an automated system until the film layer separates from the ply at the edge.

According to another aspect, apparatus is provided for separating a film layer from a ply of composite prepreg. The apparatus comprises an end effector, a clamping mechanism and a flicking mechanism. The clamping mechanism is mounted on the end effector is configured to clamp the ply. The flicking mechanism is configured to separate the film layer from the ply by flicking an edge of the ply.

According to still another aspect, a system is provided for removing a film layer from the ply of composite prepreg. The system comprises a first robotic system configured to pick up and clamp a ply of prepreg, and a second robotic system configured to separate the film layer from the ply.

One of the advantages of the disclosed embodiments is that a film layer adhered to a ply of prepreg can be easily and reliably separated from the ply in preparation for removing the film layer from the ply. Another advantage is that separation of the film layer from the ply is automated. A further advantage of the disclosed embodiments is that a film layer removing mechanism can be carried on an end effector that is used to pick up and place a ply. Still another advantage is that separation of the film layer from the ply can be sensed, and operating parameters can be automatically controlled to optimize the process of separating of the film layer from the ply.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

DETAILED DESCRIPTION

Figure 1:
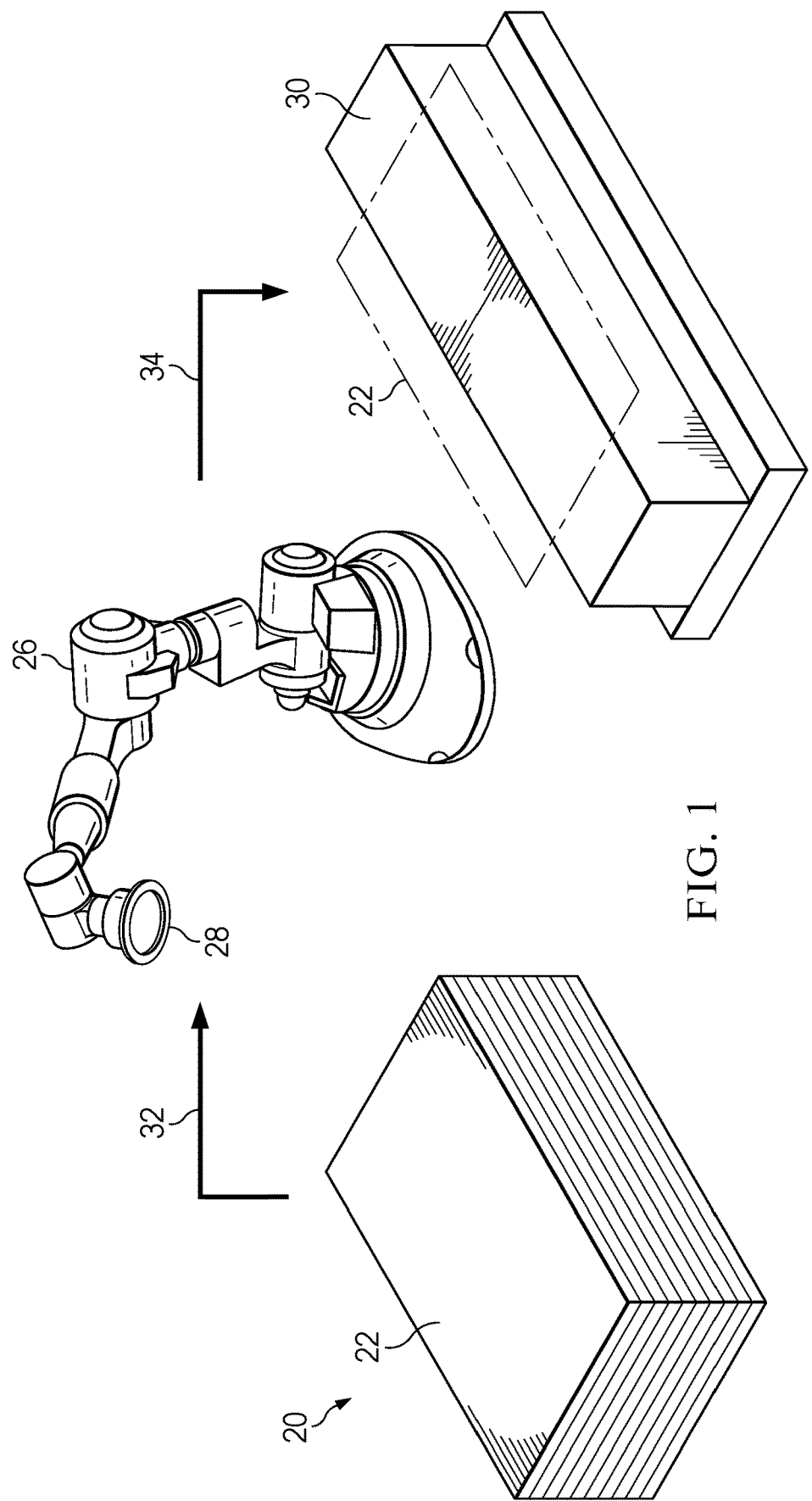
FIG. 1 is an illustration of a perspective view of a manipulator picking prepreg plies from a stack and placing them on a layup tool.
Figure 2:
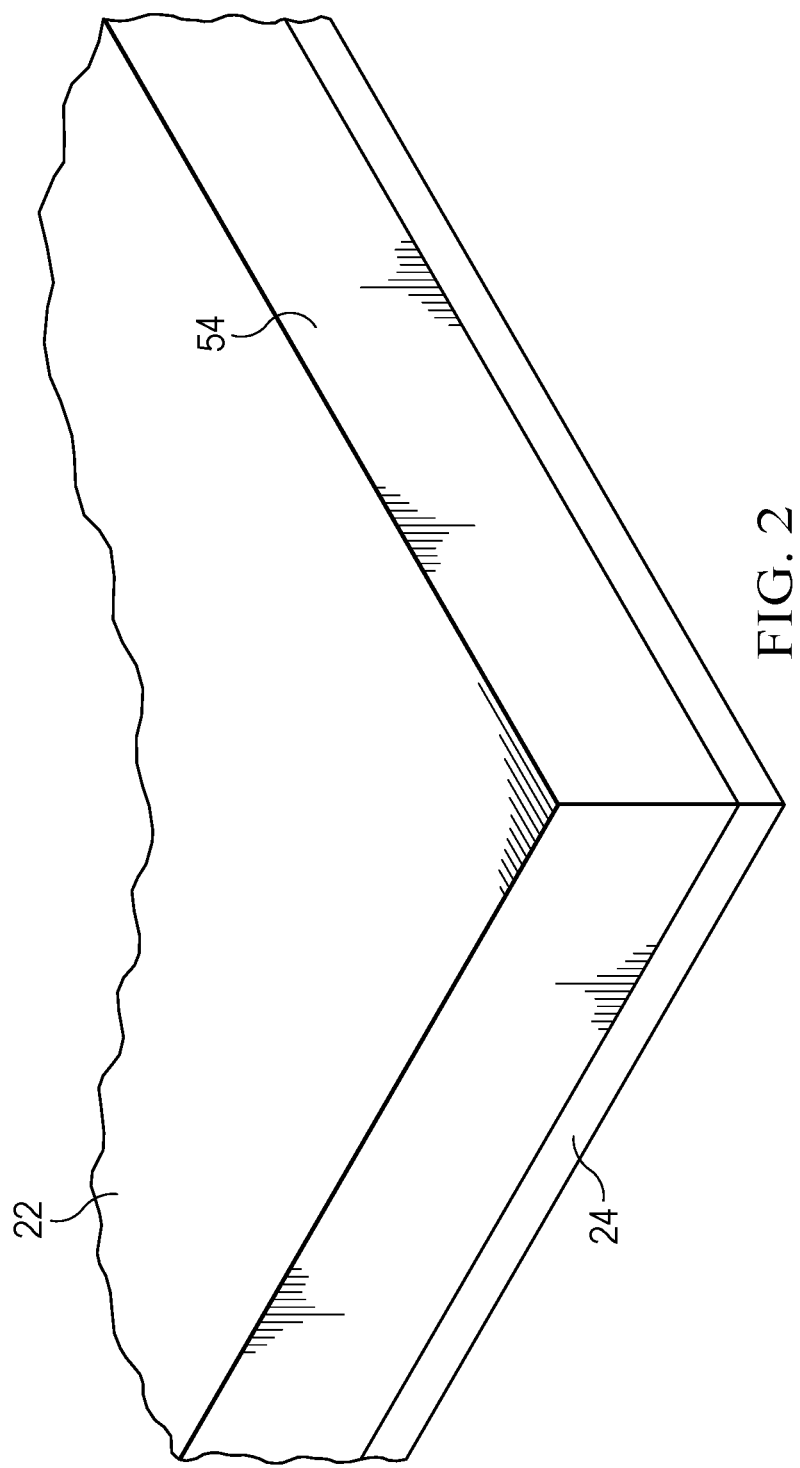
FIG. 2 is an illustration of a fragmentary, perspective view showing a corner of one of the prepreg plies.

Referring first to FIG. 1, thermoset composite prepreg is cut into plies 22 having a predetermined shape that are assembled into an ordered stack 20 according to a desired ply schedule. Each of the plies 22 comprises a reinforcement held in a thermoset resin matrix. The plies 22 are sequentially picked up 32 from the stack 20 by an end effector 28 on a manipulator 26. The manipulator 26 transfers 34 and places the ply 22 on a layup tool 30 where it is formed down onto the layup tool 30 using any of several suitable forming techniques. As shown in FIG. 2, each of the plies 22 has a film layer 24 of a suitable polymer, sometimes referred to as a "backing paper" that is adhered to the ply 22 in order to prevent the plies 22 from sticking together in the stack 20 because of their tack. The film layer 24 must be removed before the ply 22 is laid up on the layup tool 30. Removal of the film layer 24 requires separating the film layer 24 from the ply 22 along an edge 54 of the ply 22, and then peeling the film layer 24 away from the ply 22.

Figure 3:
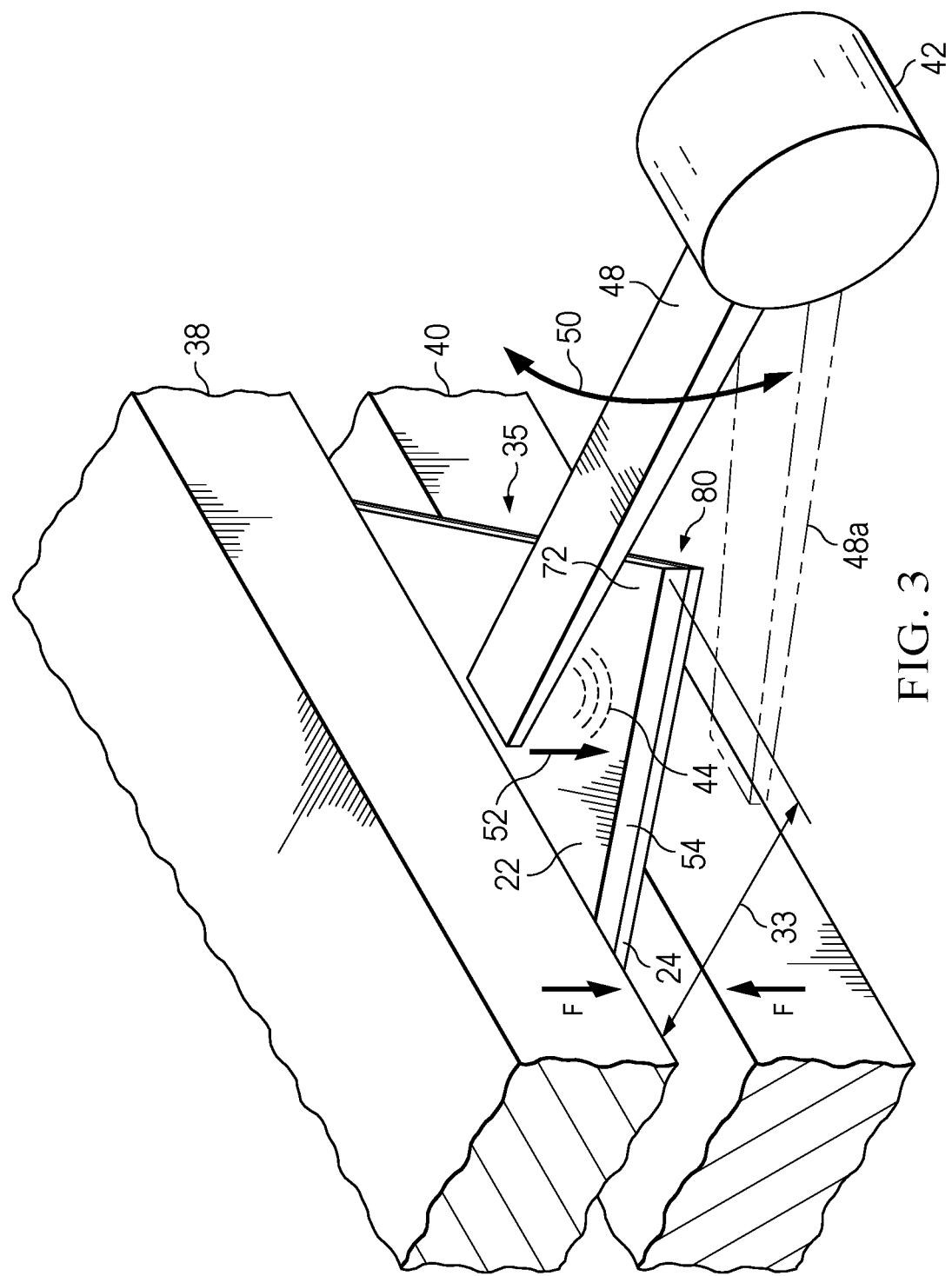
FIG. 3 is an illustration of a fragmentary, perspective view showing a flicking mechanism flicking a corner of a prepreg ply clamped between first and second clamping members.
Figure 4:
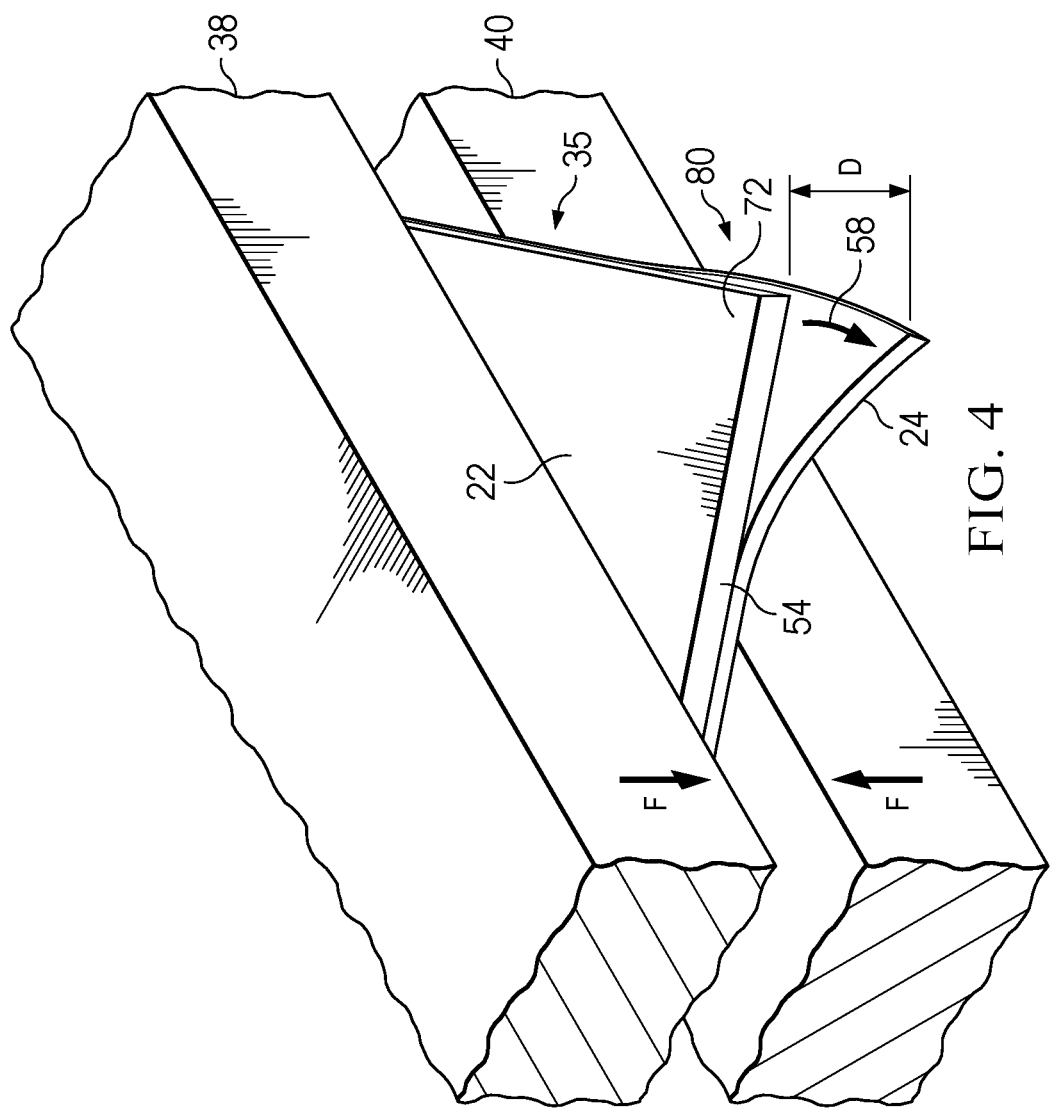
FIG. 4 is an illustration of a view similar to FIG. 3 but showing the film having been separated from the prepreg ply.

Attention is now directed to FIGS. 3 and 4 which illustrate a method of separating the film layer 24 from the ply 22. In this example, the ply 22 is clamped between a first clamping member 38 and a second clamping member 40, with an edge 54 of the ply 22 exposed and suspended 80 in air. In this example, the edge (54) is exposed and located only at a corner 72 of the ply 22, however in other examples, a length L along an edge 54 of the ply 22 (FIG. 5) may be exposed. Because of the relative rigidity of prepreg, the edge 54 of the ply 22, and particularly the corner 72 is cantilevered 35 from the first and second clamping members 38, 40. The ply 22 is arranged between the clamping members 38, 40 such that edge 54 extends outwardly beyond the clamping members 38, 40 a preselected distance 33. With the ply 22 clamped between the first and second clamping members 38, 40, a flicker 48 positioned in overlapping relationship to the corner 72 is rotated 50 by a flicking mechanism 42 which causes the flicker 48 to strike 52 the edge 54 of the ply 22. Striking the edge 54 imparts impact energy 44 to the ply 22 which causes the film layer 24 to separate 58 (FIG. 4) from the ply 22. Clamping the ply so as to expose only an edge 54, isolates and stabilizes the edge 54, and therefore concentrates the impact energy that is imparted to the ply 22 by the flicker 48. The flicker 48 may comprise any suitable material having sufficient rigidity to strike 52 the ply 22 and impart the impact energy 44. However, in some examples, the flicker 48 may be rigid, while in other examples the flicker 48 may be flexible in order to reduce possible damage to the ply 22 due to being struck. The shape of the flicker 48 is configured to match the shape of the edge 54 that it strikes 52 in order to maximize the impact energy that is imparted to the edge 54 by the flicker 48.

Figure 3A:
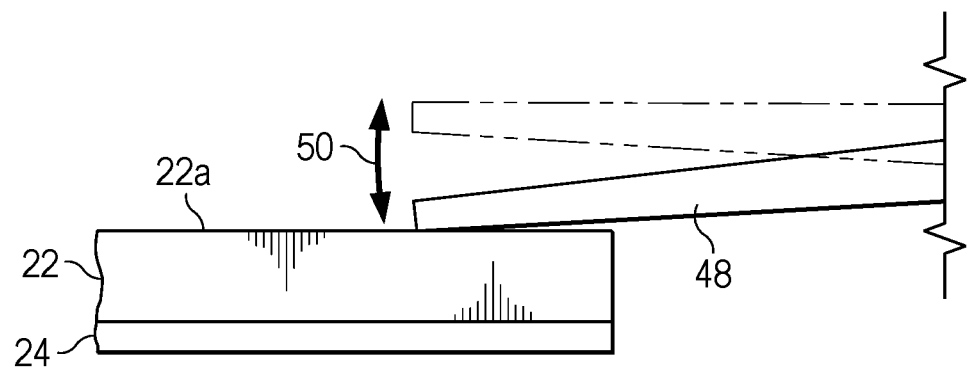
FIG. 3A is an illustration of a fragmentary, side view showing one technique for flicking the corner of the prepreg ply.
Figure 3B:
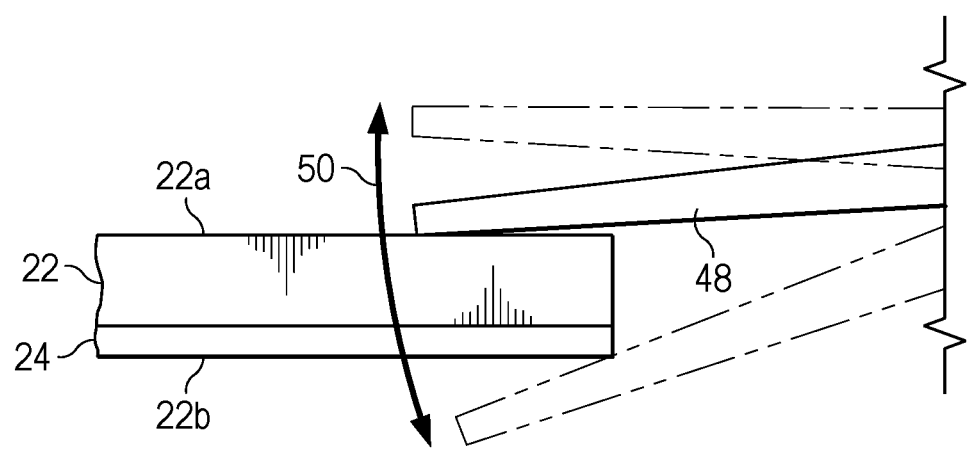
FIG. 3B is an illustration of a view similar to FIG. 3A but showing an alternate flicking technique for flicking the corner of the prepreg ply.

Referring to FIG. 3A, in one example, the flicker 48 can be rotated 50 at a desired frequency to strike 52 only one side 22a of the ply 22 one or more times. In another example shown in FIG. 3B, the flicker 48 may rotate 50 down past the edge 54, causing the ply 22 to deflect, and then return so as to repeatedly strike 52 both sides 22a, 22b of the ply 22. The clamping force F applied to the ply 22 by the first and second clamping members 38, 40 should be sufficient to prevent the ply 22 from moving as the edge 54 is being struck by the flicker 48. Clamping the ply 22 in this manner effectively isolates the edge 54 from other areas of the ply 22, causing the impact energy 44 to be focused on the edge 54, rather than propagating inwardly 43 to other areas of the ply 22. As will be discussed below, the edge 54 of the ply 22 may be cooled before and/or during the flicking process in order to reduce the viscosity of the thermoset resin matrix which in turn reduces its tack and therefore its adhesion to the film layer 24, making it easier to separate the film layer 24 from the ply 22.

Figure 5:
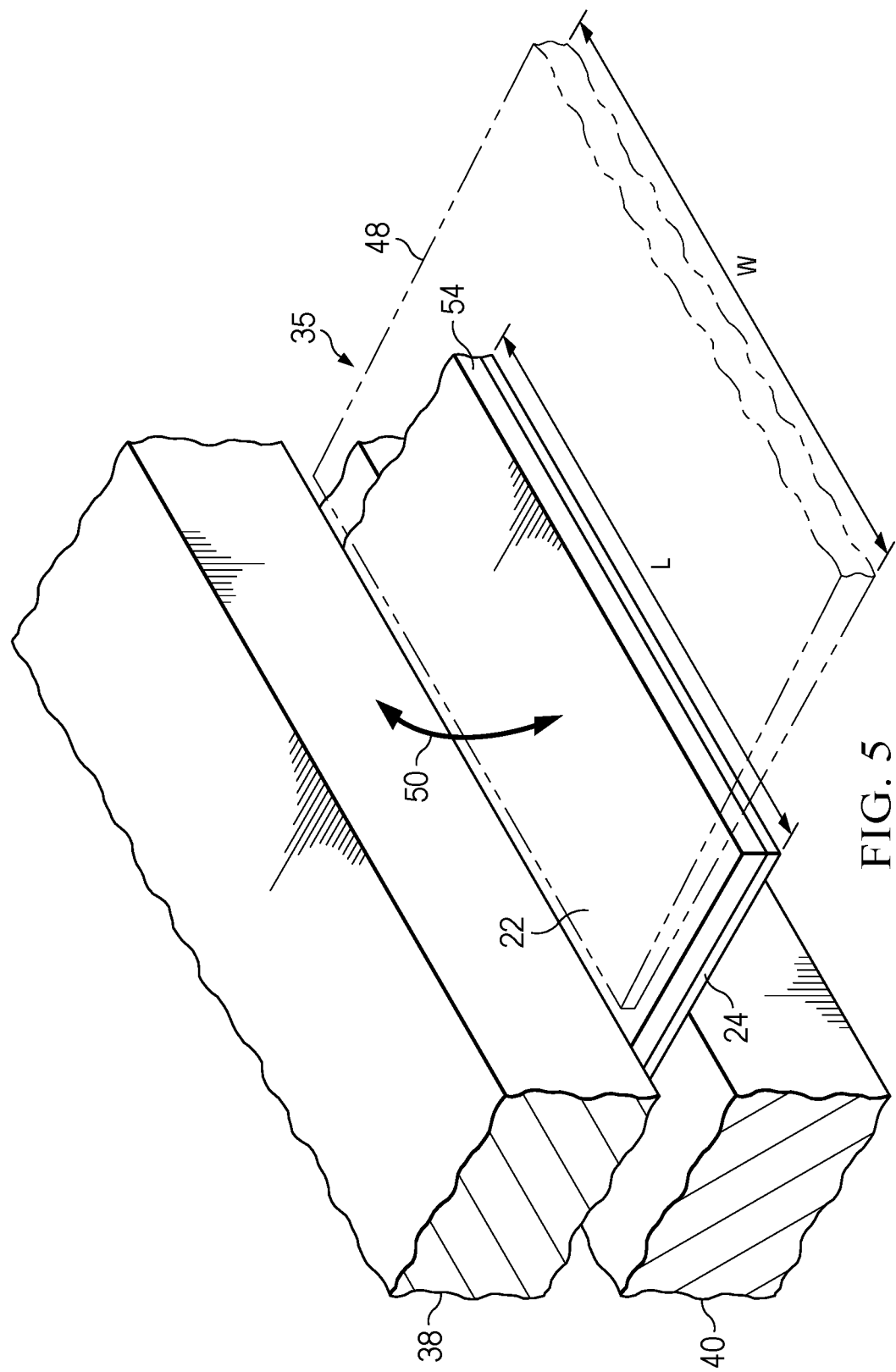
FIG. 5 is an illustration of a fragmentary, perspective view showing the position of an alternate form of a flicker relative to a longitudinally extending edge of a prepreg ply clamped between first and second clamping members.

In the example shown in FIGS. 3 and 4, only a corner 72 of the ply extends beyond the first and second clamping members 38, 40 the desired distance 33 and is subject to being struck by the flicker 48. However, as shown in FIG. 5, the ply 22 may be clamped between the first and second clamping members 38, 40 such that a length L of the edge 54 may be exposed and suspended 80 in air, rather than only a corner 72. Thus, the entire edge 54 is cantilevered along its length L. In this example, the flicker 48 has a width W that is sufficient to strike 52 substantially the entire length L of the edge 54 that is exposed.

Figure 6:
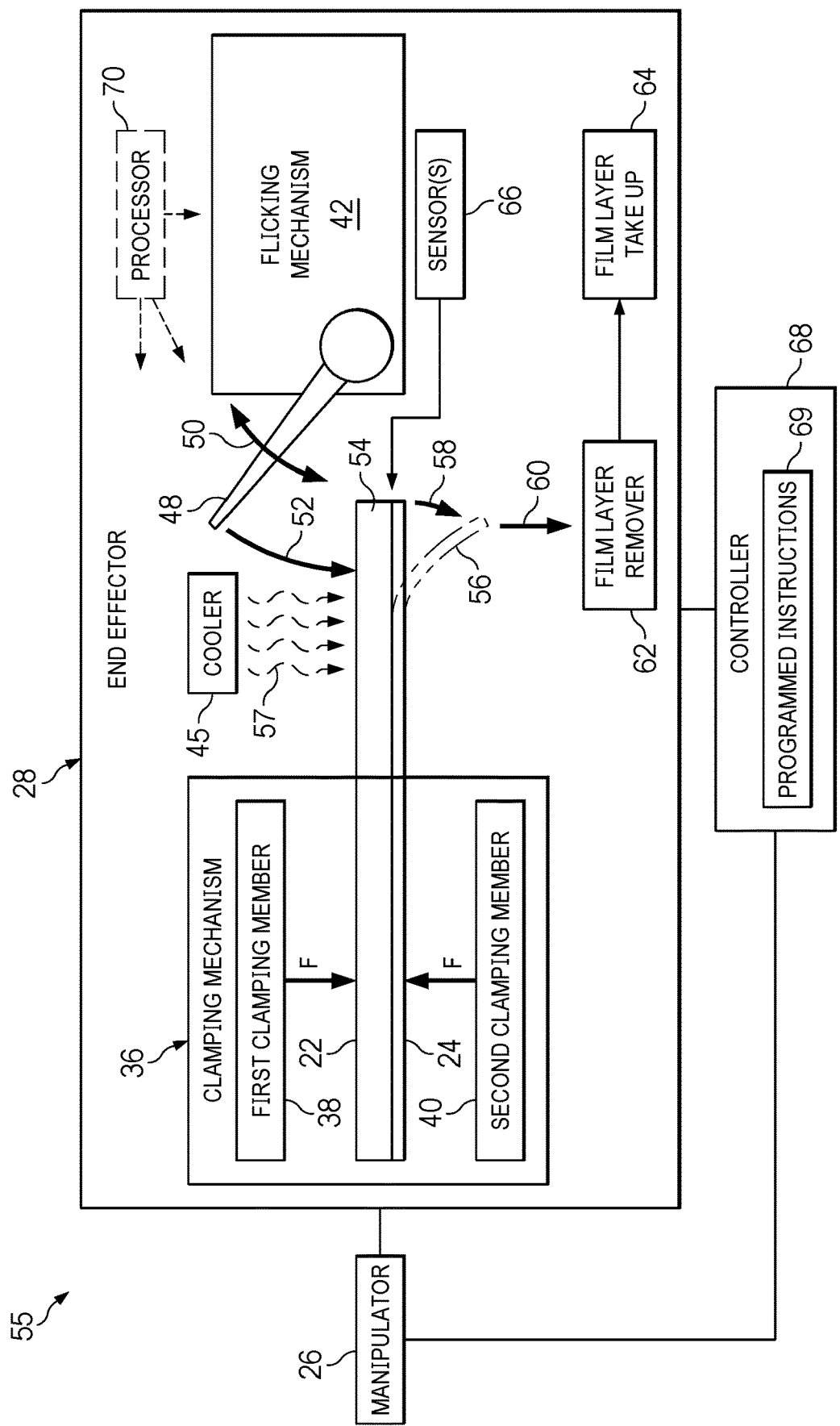
FIG. 6 is an illustration of a combined block and diagrammatic view of a system for separating a film layer using a manipulator.

Reference is now made to FIG. 6 which broadly illustrates a system 55 for separating and removing a film layer 24 from a ply 22. As will be discussed below, the system 55 is automated. A clamping mechanism 36 is mounted on an automatically controlled end effector 28 mounted on a manipulator 26 which may comprise, for example, an articulated arm or gantry type robot. The clamping mechanism 36 includes a first clamping member 38 and a second clamping member 40 which clamp a ply 22 therebetween with a force F that is sufficient to securely hold least a portion of the ply 22 against movement. As in the examples previously described, an edge 54 of the ply 22 is cantilevered 35 on and extends beyond the first and second clamping members 38, 40 a preselected distance 33 that is optimized to facilitate separation of the film layer 24 from the ply 22. Consequently, the edge 54 is exposed and suspended in the air. The system 55 further includes a flicking mechanism 42 including a flicker 48 that is positioned to strike 52 the exposed edge 54 one or more times. The flicking mechanism 42 may comprise a suitable motor (not shown) that drives the flicker 48 either directly or through the suitable gearing (not shown) to rotate (50). A suitable cooler 45 may be provided to cool the edge 54 of the ply 22, using a stream of cool air 57, however, other cooling techniques are possible. Cooling the edge 54 of the ply 22 reduces the viscosity of the thermoset matrix which reduces the prepreg's tack, thereby reducing the adhesion of the ply 22 to the film layer 24 which makes it easier to separate the film layer 24 from the ply 22.

One or more noncontact sensors 66 may be provided to sense when, and the degree to which at least a portion 56 of the film layer 24 separates 58 from the ply 22 and flicking of the edge 54 can be terminated. For example, the sensor 66 may be an optical sensor that senses when the film layer 24 has been separated from the ply 22 a desired distance D (FIG. 4), that would allow the film layer 24 to be removed from the ply 22. A film layer remover 62 may be provided to grab the portion 56 of the edge 54 and remove 60 the film layer 24 as it is separated from the ply 22. A suitable film layer take-up 64 such as a roller system (not shown) may be provided to assist in accumulating and storing the film layer 24 as it is being removed 60 from the ply 22.

Operation of the manipulator 26 as well as the end effector 28 is coordinated and controlled by a controller 68 which may comprise a programmed computer, a PLC (programmable logic controller) or one or more digital processors, or a similar programmed controller. The controller 68 includes one or more sets of programmed instructions 69 that determine operation of the controller 68. Additionally, one or more processors 70 located on the end effector 28 can be provided to control one or more functions on the end effector 28. The controller 68 and/or the processors 70 are programmed to control components of the system in manner that optimizes separation and removal of the film layer 24 from the ply 22. For example, and without limitation, the controller 68 optimizes one or more of the following parameters, individually or in combination, to most effectively, quickly and reliably effect separation 58 of the film layer 24 from the ply 22: the clamping force F applied to the ply 22 by the clamping members 38, 40; the distance 33 that the edge 54 extends and is cantilevered from the clamping members 38, 40 and is therefore subject to being flicked by the flicker 48; the viscosity of the ply 22 as determined by the temperature of the ply 22; the force with which the flicker 48 strikes 52 the edge 54 of the ply 22; the frequency with which the flicker 48 strikes 52 the edge 54; and the degree to which the film layer 24 is to be separated from the ply 22.

Figure 7:
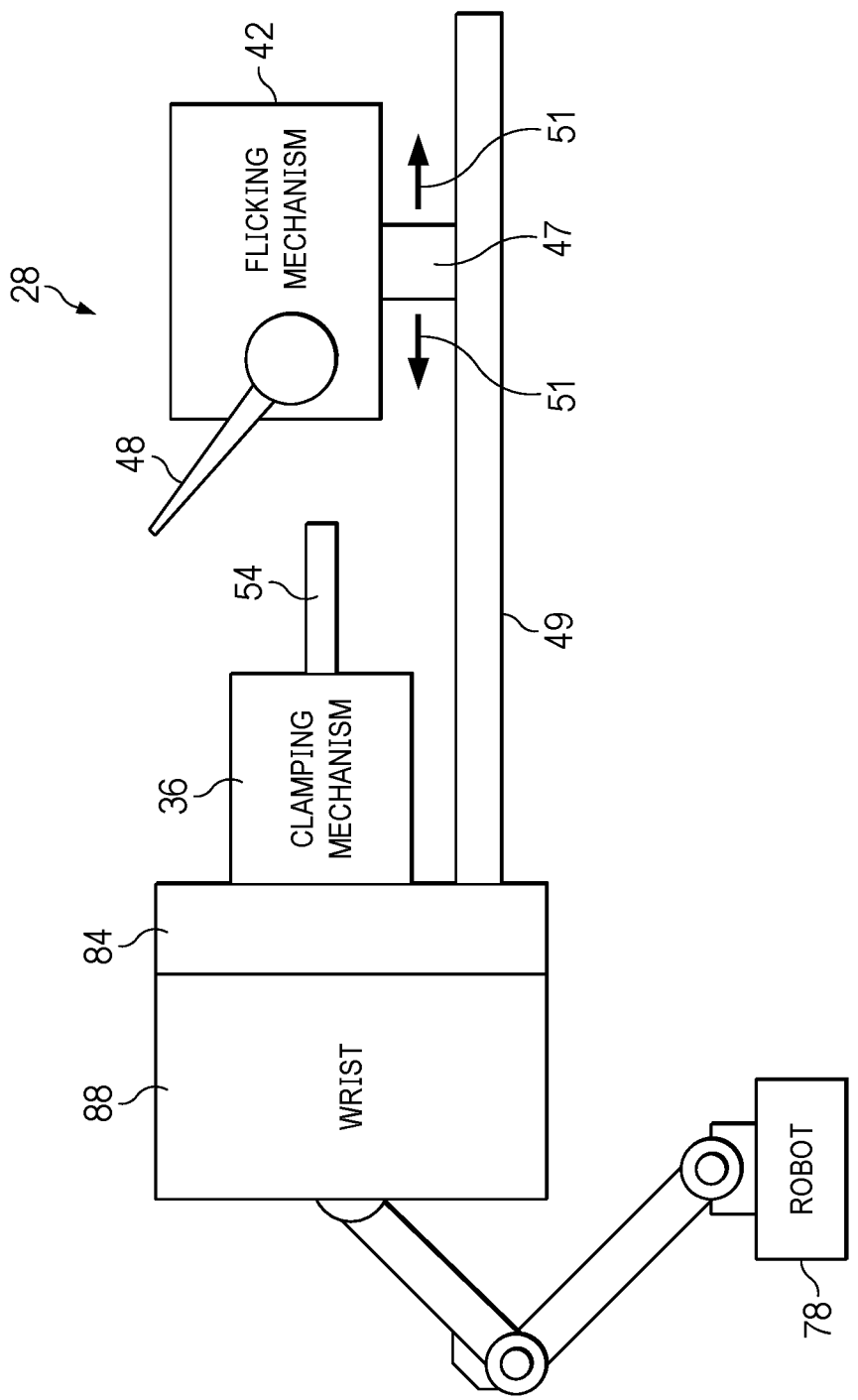
FIG. 7 is an illustration of a combined block and diagrammatic view showing how the flicking mechanism and the clamping mechanism can be operated by a single robot.

FIG. 7 illustrates an example in which both the clamping mechanism 36 and the flicking mechanism 42 are mounted on one end effector 28. The end effector 28 is mounted via an adapter 84 to the wrist 88 of an articulated robot 78 or similar manipulator. The clamping mechanism 36 is mounted directly to the adapter 84, while the flicking mechanism 42 includes a slide 47 mounted on a support 49 for movement 51 toward and away from the clamping mechanism 36. The support 49 is mounted on the adapter 84. The position of the flicking mechanism 42 relative to the exposed edge 54 of the ply 22 is controlled either by an onboard processor 70 (FIG. 6) or a suitable controller 68 which may also control other operations of the robot 78.

Figure 8:
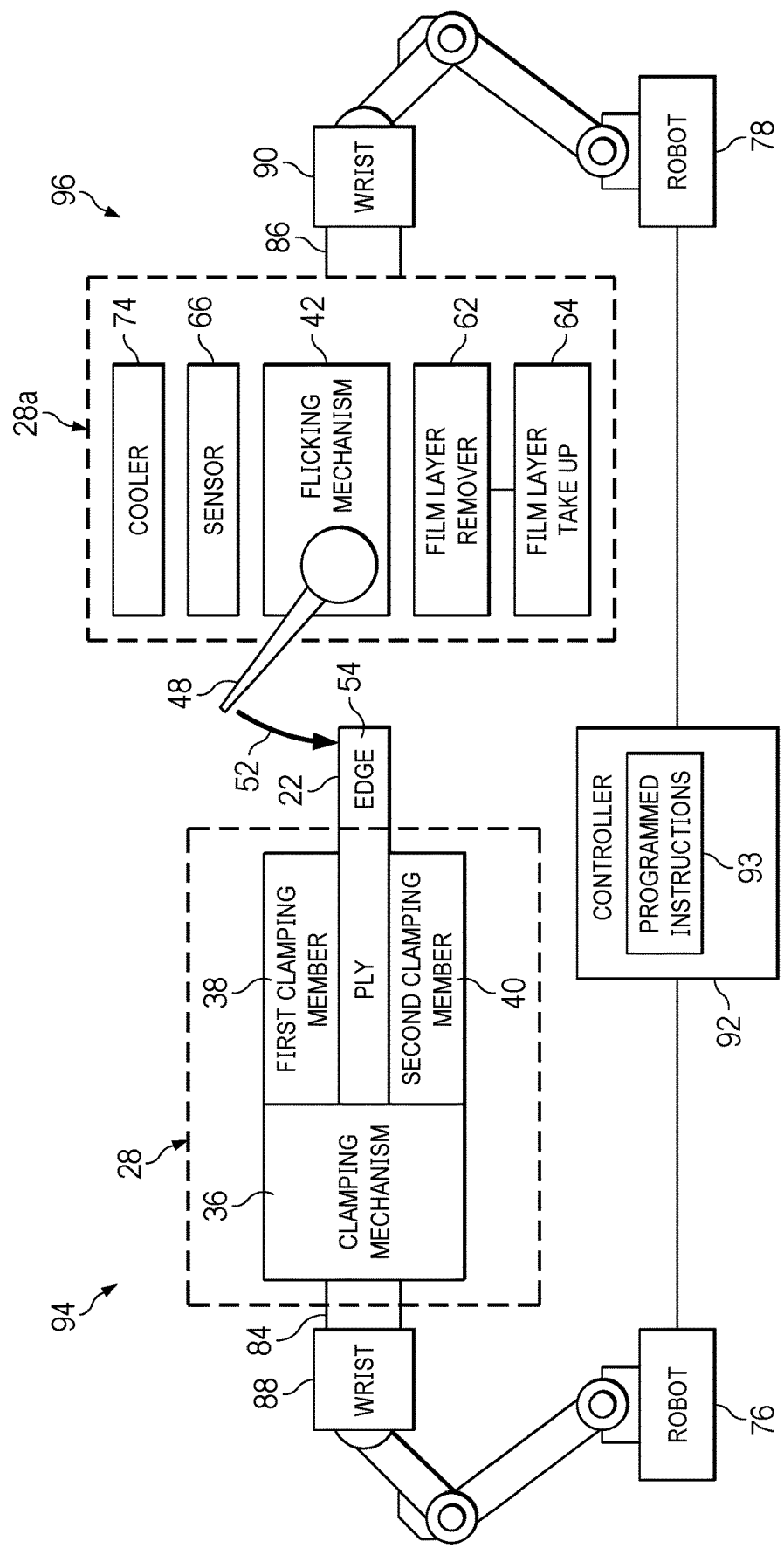
FIG. 8 is an illustration of a combined block and diagrammatic view of an alternate system for separating a film layer from an edge of a prepreg ply using two robotic systems.

Attention is now directed to FIG. 8 which illustrates another example of a robotic system 94 used to separate the film layer 24 from a ply 22 of prepreg. In this example, a first end effector 28 is used to pick up and clamp the ply 22, while a second end effector 28a is used to flick an edge of 54 of the ply 22 and remove the film layer 24. The first end effector 28 includes a clamping mechanism 36 mounted via an adapter 84 to the wrist 88 of a robot 76 which may be of the articulated arm type. As in previously described examples, the clamping mechanism 36 applies clamping pressure to the first and second clamping members 38, 40 which clamp a ply 22 therebetween with an edge 54 exposed and suspended 80 in air. The second end effector 28a comprises a flicking mechanism 42, a noncontact sensor 66, a cooler 74, a film layer remover 62 and a film layer take-up 64.

The second end effector 28a is mounted by an adapter 86 to the wrist 90 of a robot 78. The operations of the robots 76, 78 are independently controlled by a suitable controller 92 which may comprise a programmed computer, a PLC or one or more digital processors. In operation, robot 76 picks up and clamps a ply 22, and positions the edge 54 in readiness to have the film layer 24 from the ply 22. Robot 78 brings second end effector 28a into proximity to the edge 54 of the ply 22, and positions the flicker 48 over the edge 54. A cooler 74 may be activated to reduce the temperature of the ply 22 along the edge 54, which in turn reduces the viscosity of the thermoset resin matrix and tack of the prepreg. This reduction in viscosity reduces adherence of the film layer 24 to the ply 22, allowing the film layer 24 to more easily separate from the ply 22. The flicking mechanism 42 is then actuated, causing the flicker 48 to repeatedly strike 52 the edge 54 until the film layer 24 separates from the ply 22. Separation of the film layer 24 from the ply 22 is sensed by a sensor 66 which prompts the flicking mechanism 42 to terminate striking the edge 54 when a preselected degree of separation is sensed. Upon separation of the film layer 24 from the ply, the film layer remover 62 removes the film layer 24 and delivers it to a film layer take-up 64.

Similar to the example described previously in connection with FIG. 6, controller 92 includes or has access to programmed instructions 93 which control components of the systems 94, 96 in manner that optimizes separation and removal of the film layer 24 from the ply 22. For example, and without limitation, the controller 92 optimizes one or more of the following parameters, individually or in combination, to most effectively, quickly and reliably effect separation 58 of the film layer 24 from the ply 22: the clamping force F applied to the ply 22 by the clamping members 38, 40; the distance 33 that the edge 54 extends and is cantilevered from the clamping members 38, 40 and is therefore subject to being flicked by the flicker 48; the viscosity of the ply 22 as determined by the temperature of the ply 22; the force with which the flicker 48 strikes 52 the edge 54 of the ply 22; the frequency with which the flicker 48 strikes 52 the edge 54; and the degree to which the film layer 24 is to be separated from the ply 22.

Figure 9:
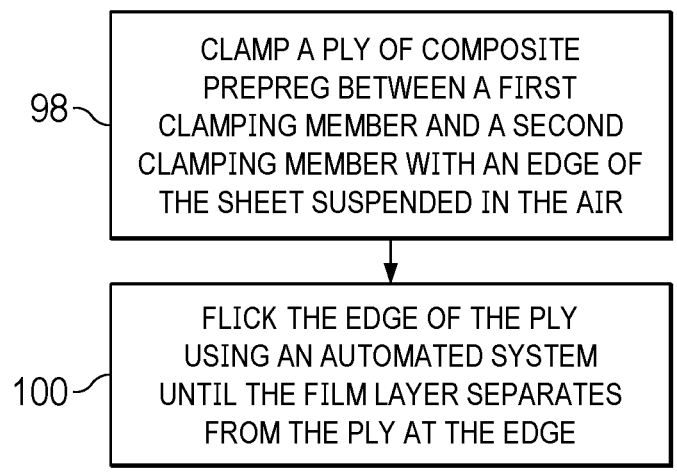
FIG. 9 is illustration of an overall block diagram of a method of separating film layer from an edge of a prepreg ply.

Attention is now directed to FIG. 9 which broadly illustrates the steps of a method of separating a film layer 24 from a ply 22 of prepreg. At 98, a ply 22 of composite prepreg is clamped between first and second clamping members 38, 40 with an edge 54 of the ply 42 exposed and suspended in the air. At 100, the edge 54 of the ply 22 is flicked until the film layer 24 separates from the ply 22 at the edge 54.

Figure 10:
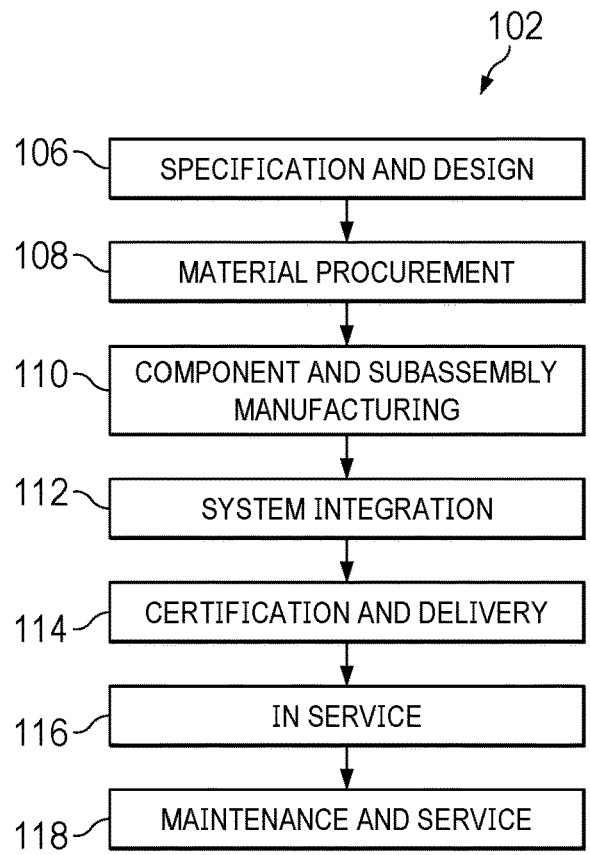
FIG. 10 is an illustration of a flow diagram of aircraft production and service methodology.
Figure 11:
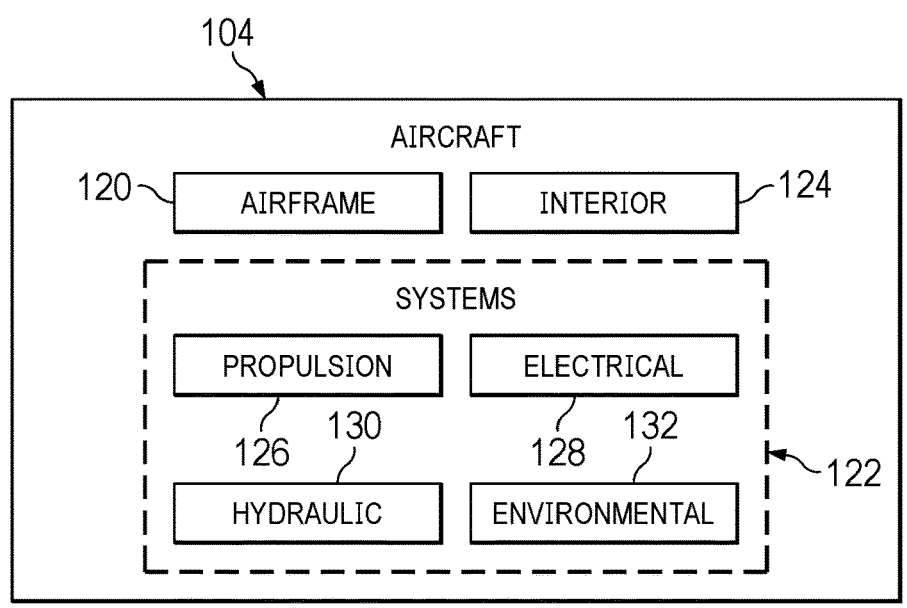
FIG. 11 is an illustration of a block diagram of an aircraft.

Examples of the disclosure may find use in a variety of potential applications, particularly in the transportation industry, including for example, aerospace, marine, automotive applications and other application where thermoset prepreg is used to produce parts. Thus, referring now to FIGS. 10 and 11, examples of the disclosure may be used in the context of an aircraft manufacturing and service method 102 as shown in FIG. 10 and an aircraft 104 as shown in FIG. 11. Aircraft applications of the disclosed examples may include a variety of parts and structures produced by laying up thermoset prepreg. During pre-production, the manufacturing and service method 102 may include specification and design 106 of the aircraft 104 and material procurement 108. During production, component and subassembly manufacturing 110 and system integration 112 of the aircraft 104 takes place. Thereafter, the aircraft 104 ay go through certification and delivery 114 in order to be placed in service 116. While in service 116 by a customer, the aircraft 104 is scheduled for routine maintenance and service 118, which may also include modification, reconfiguration, refurbishment, and so on.

Each of the processes of manufacturing and service method 102 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 104 produced by manufacturing and service method 102 may include an airframe 120 with a plurality of high-level systems 122 and an interior 124. Examples of high-level systems 122 include one or more of a propulsion system 126, an electrical system 128, a hydraulic system 130 and an environmental system 132. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 102. For example, components or subassemblies corresponding to component and subassembly manufacturing 110 be fabricated or manufactured in a manner similar to components or subassemblies produced while the aircraft 104 is in service. Also, one or more apparatus examples, method examples, or a combination thereof may be utilized during the component and subassembly manufacturing 110, and system integration 112, for example, by substantially, expediting assembly of or reducing the cost of an aircraft 104. Similarly, one or more of apparatus examples, method examples, or a combination thereof may be utilized while the aircraft 104 is in service, for example and without limitation, to maintenance and service 118.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of separating a film layer adhered to a ply of composite prepreg, comprising:
    clamping the ply between a first clamping member and a second clamping member to expose only an edge of the ply such that the edge of the ply is suspended in air; and
    flicking the edge of the ply using an automated system to impart an impact energy to the edge of the ply until the film layer separates from the ply at the edge, wherein the clamping isolates the edge from other areas of ply and causes the impact energy of the flicking imparted to the edge to be focused on the edge without propagating inwardly to the other areas of the ply.

2. The method of claim 1, wherein:
    the ply has a corner;
    the edge is located at a corner of the ply; and
    flicking the edge is performed by flicking the corner while clamping the ply between the first clamping member and the second clamping member.

3. The method of claim 2, wherein clamping the ply includes positioning the ply between the first clamping member and the second clamping member such that the edge of the ply is cantilevered along its length and is suspended in air.

4. The method of claim 2, wherein clamping the ply includes positioning the ply between the first clamping member and the second clamping member such that the corner extends beyond and is cantilevered from the first clamping member and the second clamping member.

5. The method of claim 1, wherein:
    clamping the ply includes suspending a corner of the ply in air; and
    flicking the edge is performed by striking the corner of the ply.

6. The method of claim 5, wherein striking the corner is performed by rotating a flicker, and using the flicker to repeatedly strike the corner of the ply.

7. The method of claim 5, further comprising:
    optimizing separation of the film layer from the ply by adjusting at least one of:
        a distance that the edge extends beyond the first clamping member and the second clamping member;
        a clamping force applied to the ply by the first clamping member and the second clamping member;
        a force applied to the corner of the ply during striking the corner;
        a frequency of striking the corner;
        a temperature of the ply; and
        a degree to which the film layer is to be separated from the ply.

8. The method of claim 1, further comprising:
    sensing when the film layer has separated from the ply a preselected degree of separation; and
    terminating the flicking when the preselected degree of separation has been sensed.

9. The method of claim 1, further comprising:
    reducing adherence of the film layer to the ply by reducing a viscosity of a resin matrix in the ply.

10. The method of claim 9, wherein reducing the viscosity is performed by cooling the edge.

11. The method of claim 1, wherein the clamping and flicking is performed by an automatically controlled end effector.

12. A portion of an aircraft assembled using the method of claim 1.

13. The method of claim 1, wherein flicking the edge is performed by a flicker and a shape of the flicker is configured to match the shape of the edge.

14. The method of claim 7, wherein the clamping force is sufficient to prevent the ply from moving as the edge is being flicked by a flicker.

15. The method of claim 1, wherein flicking the edge is performed by rotating a flicker at a desired frequency to strike only one side of the ply one or more times.

16. The method of claim 1, wherein flicking the edge is performed by rotating a flicker at a desired frequency to strike both sides of the ply.

17. The method of claim 1, wherein flicking the edge is performed by rotating a flicker and the flicker has a width that is sufficient to strike an entire length of the edge.

18. The method of claim 1, further comprising removing the separated film layer from the ply.

19. The method of claim 1, further comprising sensing when the film layer has separated from the ply a preselected degree of separation.

20. The method of claim 1, further comprising terminating the flicking when the film layer has separated from the ply a preselected degree of separation.

* * * * *